(12) United States Patent
Zhou

(10) Patent No.: US 8,812,910 B2
(45) Date of Patent: Aug. 19, 2014

(54) PILOT PROCESS METHOD FOR SYSTEM BOOT AND ASSOCIATED APPARATUS

(75) Inventor: Tao Zhou, Shanghai (CN)

(73) Assignee: MStar Semiconductor, Inc. (TW)

( * ) Notice: Subject to any disclaimer, the term of this patent is extended or adjusted under 35 U.S.C. 154(b) by 211 days.

(21) Appl. No.: 13/349,560

(22) Filed: Jan. 12, 2012

(65) Prior Publication Data

US 2013/0055019 A1    Feb. 28, 2013

(30) Foreign Application Priority Data

Aug. 23, 2011    (CN) .......................... 2011 1 0242733

(51) Int. Cl.
  *G06F 11/00* (2006.01)
  *G06F 11/14* (2006.01)
  *G06F 11/10* (2006.01)
  *G06F 11/07* (2006.01)

(52) U.S. Cl.
  CPC ........ *G06F 11/1417* (2013.01); *G06F 2201/81* (2013.01); *G06F 11/073* (2013.01); *G06F 11/1068* (2013.01); *G06F 11/076* (2013.01)
  USPC .............................. 714/36; 714/47.3; 714/25

(58) Field of Classification Search
  USPC ........................................... 714/36, 25, 4.11
  See application file for complete search history.

(56) References Cited

U.S. PATENT DOCUMENTS

| | | | |
|---|---|---|---|
| 6,384,999 B1* | 5/2002 | Schibilla | 360/53 |
| 6,851,015 B2* | 2/2005 | Akahane et al. | 711/103 |
| 2008/0082860 A1* | 4/2008 | Yamamoto et al. | 714/8 |
| 2009/0031169 A1* | 1/2009 | Bower et al. | 714/37 |
| 2009/0083579 A1* | 3/2009 | Lockwood et al. | 714/30 |

\* cited by examiner

*Primary Examiner* — Sarai Butler

(74) *Attorney, Agent, or Firm* — Han IP Corporation

(57) ABSTRACT

A pilot process method for system boot and an associated are provided. An environment variable is read from a NAND flash memory. When an irrevocable error exists in an environment variable, the environment variable is read successively for a predetermined threshold number of times. A backup variable of the environment variable is read when the irrevocable error is still present in the environment variable that is read for a predetermined threshold number of times, and the environment variable is restored according to the backup variable. Therefore, when it is confirmed that the environment variable is damaged, a backup variable is utilized and the damaged environment variable is restored according to the backup variable, so as to ensure a normal boot-up process of the system to significantly enhance system reliability as well as user experience.

13 Claims, 4 Drawing Sheets

PILOT PROCESS METHOD FOR SYSTEM BOOT AND ASSOCIATED APPARATUS

CROSS-REFERENCE TO RELATED APPLICATION

This application claims the benefit of People's Republic of China Patent Application Serial No. 201110242733.2, filed Aug. 23, 2011, the subject matter of which is incorporated herein by reference.

BACKGROUND

1. Technical Field

The present disclosure relates in general to a computer technique, and more particularly to a pilot process method for system boot and an associated apparatus.

2. Description of Related Art

In many Linux embedded systems, in order to boot a Linux operating system, a pilot apparatus is required for piloting the Linux operating system when initializing software/hardware systems and piloting a Linux inner core. Basic system parameters related to the pilot apparatus are referred to as environment variables, e.g., an IP address on the Internet, section configurations of systems, setting parameters of memories and pilot parameters of an inner core, which are all stored in a predetermined region. The environment variables are stored in a predetermined region of a NAND flash memory that stores data in a unit of memory blocks. The pilot apparatus reads the environment variables from the NAND flash memory during the system boot-on process, and can access the environment variables in the memory afterwards. In the event of any updates of the environment variables, the updates are synchronized to the NAND flash memory.

Compared to a NOR flash memory, a NAND memory with advantages of having a fast access speed, a large capacity and a low cost per unit capacity prevails in serving as a carrier for data storage. However, although a NAND flash memory is more advantageously in terms of capacity and cost, it suffers from a drawback of having reliability that is less desirable than that of a NOR flash memory. Therefore, a system boot failure may result when an irrevocable error or damage exists in the environment variables stored in the predetermined region of the NAND flash memory.

Whether the environment variables are erroneous or damaged directly determines whether a system can be successfully booted, meaning that any error or damage in the environment variables would greatly impact user experience negatively in using the system. Therefore, there is a need for a solution for storing crucial information of the environment variables with better reliability.

SUMMARY

The present disclosure is directed to a pilot process method for system boot and an associated apparatus for significantly increasing system reliability, so that an environment variable can still be read in an event that any error exists in the environment variable to allow a boot-on process of the system to be rendered without impact.

According to an aspect of the present disclosure, a pilot process method for system boot may comprise: reading an environment variable for piloting the system boot from a NAND flash memory; determining whether any irrevocable error exists in the environment variable; accumulating a successively accumulated number of reading of the irrevocable error; reading a backup variable of the environment variable when the successively accumulated number of reading of the irrevocable error reaches a predetermined threshold, the backup variable being a backup of the environment variable; and restoring the environment variable according to the backup variable.

According to another aspect of the present disclosure, a pilot process apparatus for system boot is provided. The apparatus may comprise: a first reading module that reads an environment variable for piloting the system boot from a NAND flash memory; a first determining module that determines whether an irrevocable error exists in the environment variable; an accumulating module that accumulates a successively accumulated number of reading of the irrevocable error when the first determining module determines that the irrevocable error exists in the environment variable; a second reading module that reads a backup variable of the environment variable when the successively accumulated number of reading of the irrevocable error reaches a predetermined threshold; and a restoring module that restores the environment variable according to the backup variable read by the second reading module.

Different from conventional solutions, techniques described in the present disclosure take reactive measures when an error exists in an environment variable stored in a NAND flash memory. For example, an irrevocable error in the environment variable is confirmed as present when the irrevocable error is successively read several times. Moreover, when the presence of the irrevocable error is confirmed, a backup variable is read and the environment variable with the irrevocable error is restored according to the backup variable, so that a system may be piloted for a normal boot-up process to significantly enhance system reliability as well as user experience in using the system.

The above and other aspects of the present disclosure will become better understood with regards to the following detailed description of the preferred but non-limiting embodiments. The following description is made with reference to the accompanying drawings.

DETAILED DESCRIPTION OF PREFERRED EMBODIMENTS

Figure 1:
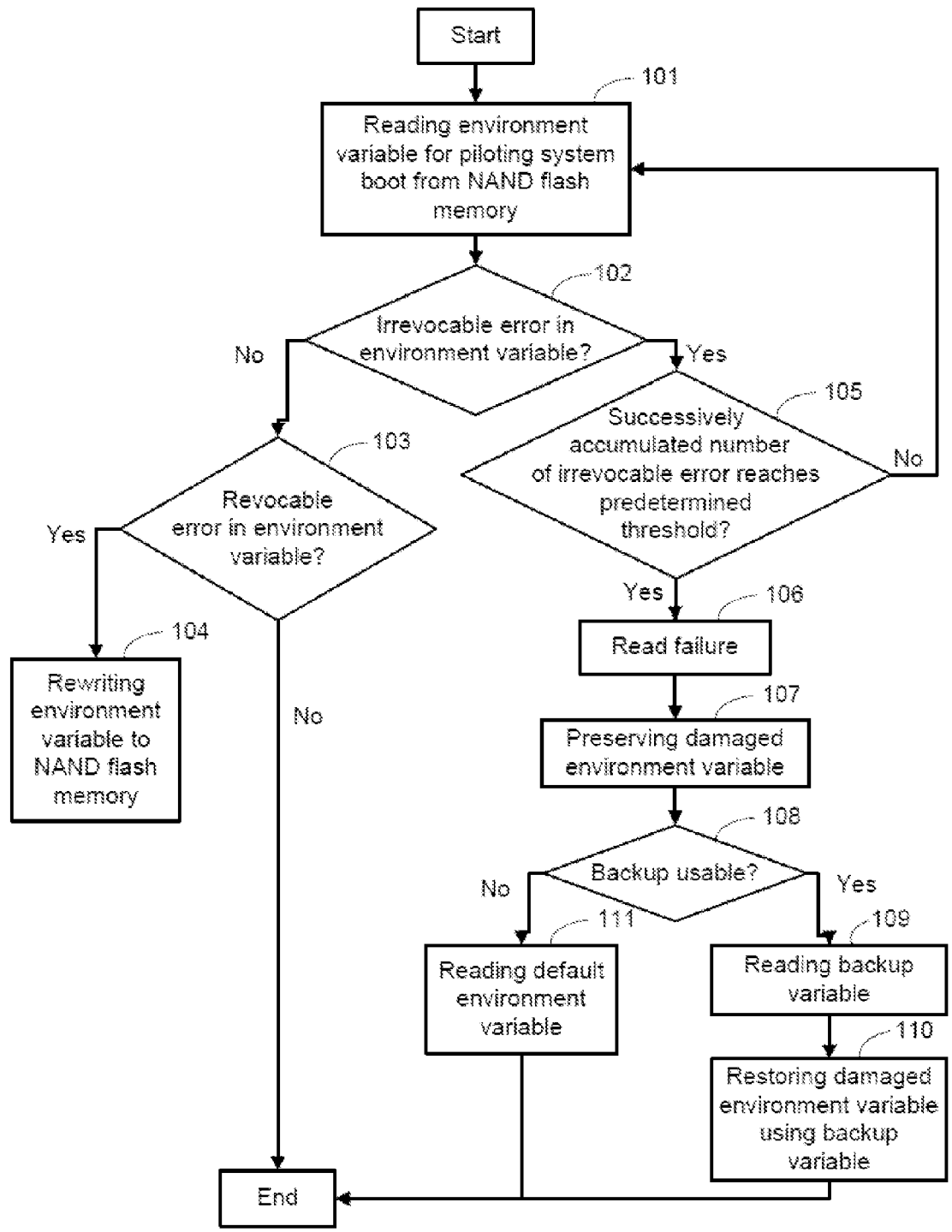
FIG. 1 is a flowchart of a pilot process method for system boot according to an embodiment of the present disclosure.

FIG. 1 shows a flowchart of a pilot process method for system boot. Step 101 comprises reading an environment variable for piloting the system boot from a NAND flash memory. During a boot-up process of a Linux embedded system, a device, e.g., CPU, reads an environment variable required for system boot from a NAND flash memory. Since data storage reliability of NAND flash memories is typically unsatisfactory, e.g., a possible error may occur when data is read, data of each page is appended with an Error Checking and Correction (ECC) code. In general, the ECC is capable of correcting errors of a small bit error rate, and is capable of reporting errors although being incapable of correcting errors of a large bit error rate.

Step 102 comprises determining whether an irrevocable error exists in the environment variable. After the CPU reads the environment variable required for system boot, it is determined whether an irrevocable error exists in the environment variable, e.g., whether a large bit error rate is present.

Step 103 comprises determining whether a revocable error exists in the environment variable. When it is determined in Step 102 that the no irrevocable error exists in the environment variable, it is then determined whether a revocable error exists in the environment variable, e.g., whether a small bit error rate is present. Step 104 is performed when a result is affirmative, i.e., a revocable error exists in the environment variable; otherwise, the system is booted according to the read environment variable.

Step 104 comprises rewriting the environment variable into the NAND flash memory. When it is determined that a revocable error exists in the environment variable in Step 103, a first memory block of the NAND flash memory where the environment variable is stored is erased, and an error-free environment variable is rewritten into the first memory block. The reason for rewriting the environment variable is that, although the revocable error may pass the ECC and can be corrected such that data is kept intact, data stored in the NAND flash memory is nevertheless somewhat damaged. The revocable error may develop into an irrevocable error to lead to a system boot failure if not remedied in time.

Step 105 comprises determining whether a successively accumulated number of reading of the irrevocable error reaches a predetermined threshold. When an irrevocable error exists in the environment variable is read once, it could mean that data is damaged, or it could mean that a read failure occurred by one or more other incidental factors such that data stored in the NAND flash is not at all damaged. To prevent interference by occurrence of the latter situation, one-time read failure is not considered as data being damaged. Instead, data is read for a plurality number of times up to a set number of times, and each time it is determined whether an irrevocable error exists in the environment variable. When an irrevocable error in the environment variable is read for a successive number of times, e.g., for the set number of times, it is determined that data stored in the NAND flash is damaged.

Therefore, the predetermined threshold is first provided. For example, the predetermined threshold is reading an irrevocable error in the environment variable by a predetermined number of times of successive readings, such as three successive readings or five successive readings for example. When it is determined in Step 102 that the irrevocable error exists in the environment variable, the environment variable stored in the NAND flash memory is continuously read, so as to continue in determining whether the irrevocable error exists in the environment variable and to accumulate a successively accumulated number of reading of the irrevocable error until the successively accumulated number of the reading of the irrevocable error reaches the predetermined threshold. Data stored in the NAND flash memory is considered damaged when there are a plurality of successive read failures for the predetermined number of times.

Step 106 comprises a read failure. As previously stated, it is confirmed that the environment variable stored in the NAND flash memory is damaged when there are a plurality of successive read failures, i.e., the irrevocable error in the environment variable has been read for a successive number of times.

Step 107 comprises preserving the damaged environment variable. When it is confirmed that data stored in the NAND flash memory is damaged, the erroneous environment variable is preserved in a predetermined region in the NAND flash memory to facilitate subsequent debugging. The erroneous environment variable allows a debugger to clearly observe how the environment variable is damaged and to take further reactive measures to prevent similar damages from occurring in the future.

Step 108 comprises determining whether a backup is usable. In this embodiment, at least two sets of backup variable information are stored in the NAND flash memory. When one environment variable is damaged, the backup variable may be utilized. Therefore, when it is determined in Step 106 that the environment variable is damaged, it should be first determined whether the backup variable is usable before utilizing the backup variable.

Step 109 comprises reading the backup variable. Step 109 is performed to read the backup variable when it is determined in Step 108 that the backup variable is usable, followed by Step 110.

Step 110 comprises restoring the damage environment variable according to the backup variable. After reading the backup variable, the damaged environment variable is restored with the backup variable to ensure a normal boot-on process of the system.

Step 111 comprises reading a default environment variable. When it is determined in Step 108 that the backup variable is unusable, a default environment variable, as a bottom line of defense, is used. In one embodiment, the default environment variable is written in a source code of Mboot (pilot software for system boot), and has default values configured for booting the system. Thus, by utilizing the default environment variable, the system is able to boot and operate even if the backup variable is damaged or the NAND flash memory is not stored with the environment variable. It should be noted that, since the default environment variable is written in the source code of Mboot, it cannot be updated and hence lacks flexibility. Thus, the default environment variable is a bottom line of defense for ensuring a normal boot-up process, and this greatly enhances user experience compared to a situation of a complete boot failure.

Based on physical characteristics of the NAND flash memory, in order to update the environment variable, it is necessary that a memory block storing previously written data be erased before writing in the new environment variable. In the event of an unexpected sudden power-off during an update process, an incomplete update process of the environment variable may result, such that the operating system may not be piloted for kernel to lead to a boot failure of the system. To solve the problem, two sets of the environment variable with identical content and serving as a mutual backup are stored in the NAND flash memory. One set is the environment variable to be read for each boot-up process while the other set is the backup variable of the environment variable. The backup variable is the backup variable read in Step 109. Further, both sets of environment variable are updated each time the environment variable is updated. Therefore, in the event of a sudden power-off during an update process, only one set of environment variable may be damaged while the other set is kept intact. The intact environment variable, as the backup variable of the environment variable, may then be utilized for a next normal boot-up process and for restoring the damaged environment variable.

More specifically, when updating the environment variable, the memory block storing the environment variable, e.g., a first memory block, is erased and the new environment variable is written therein, and the memory block storing the backup variable of the environment variable, e.g., a second memory block, is also erased and the backup variable of the new environment variable is then written therein.

Based on physical characteristics of the NAND flash memory, certain memory blocks of the NAND flash memory may be damaged when shipped out of the factory. Further, certain functioning memory blocks may become damaged during the process of utilization. Therefore, the environment variable may become damaged or may not be properly stored in the event that the memory block where the environment variable is located is damaged. Therefore, at least two memory blocks are assigned for storing the environment variable when distributing the memory blocks. In various embodiments, the number of memory blocks assigned to store the environment variable may be flexibly adjusted as desired but not limited to two memory blocks.

Figure 2:
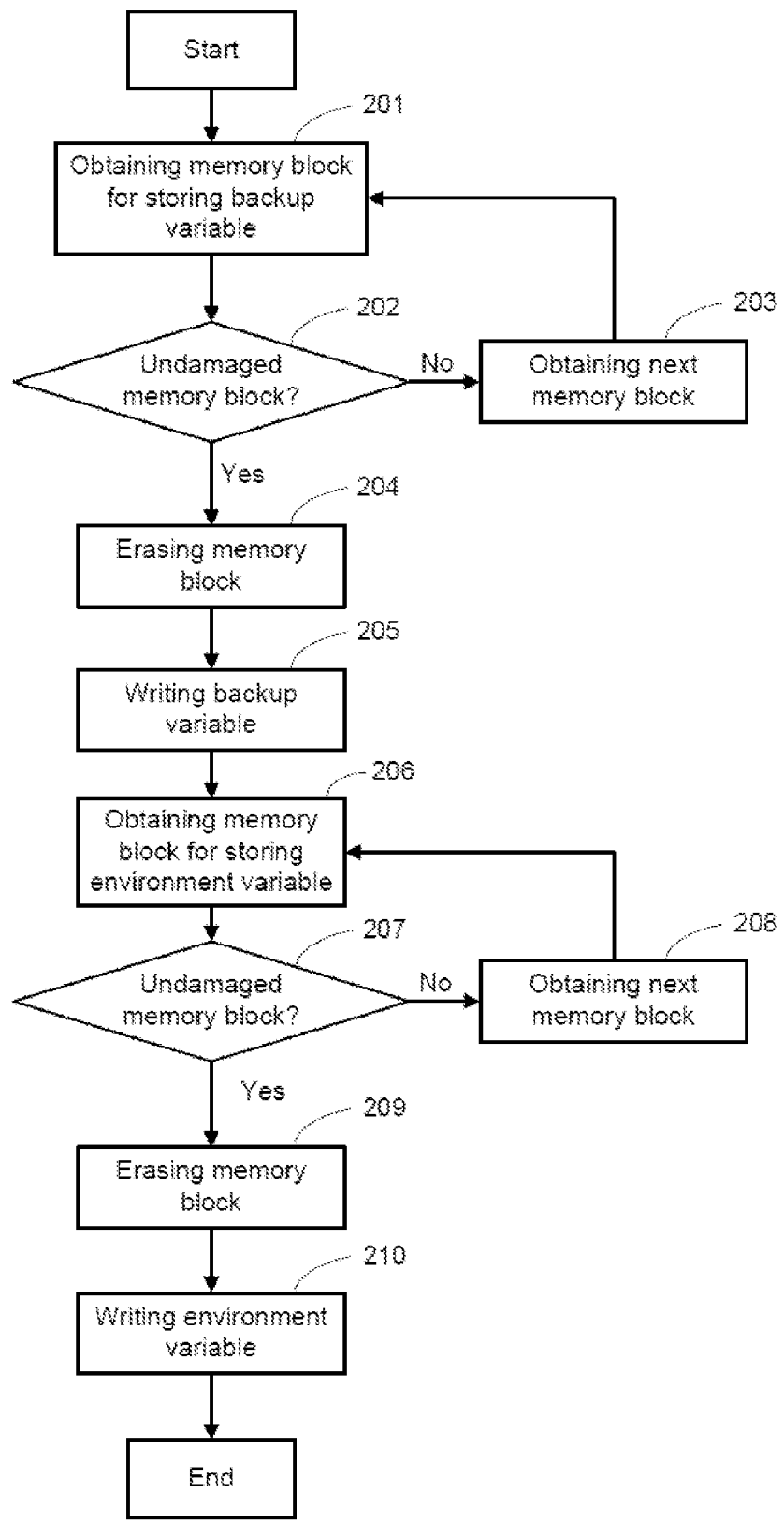
FIG. 2 is a flowchart of handling of a damaged memory block and writing in an environment variable in a pilot process method for system boot according to an embodiment of the present disclosure.

FIG. 2 shows a flowchart of a process of handling a damaged memory block and writing an environment variable according to an embodiment of the present disclosure.

Step 201 comprises obtaining a second memory block for storing the backup variable. When the environment variable is written for the first time, a second memory block for storing the backup variable is obtained.

Step 202 comprises determining whether the second memory block is an undamaged memory block. Step 203 is performed when the result is negative, i.e., the second memory block is damaged; otherwise, Step 204 is performed when the result is affirmative, i.e., the second memory block is undamaged.

Step 203 comprises obtaining a next memory block. When it is determined in Step 202 that the second memory block is a damaged memory block, a next memory block is checked until an undamaged memory block is identified.

Step 204 comprises erasing the undamaged second memory block. When it is determined in Step 202 that the second memory block is undamaged, the second memory block is erased.

Step 205 comprises writing the backup variable. After erasing the second memory block, the backup variable is written into the second memory block.

Step 206 comprises obtaining a first memory block for storing the environment variable.

Step 207 comprises determining whether the first memory block is a functioning memory block. It is determined whether the first memory block for storing the environment variable is a functioning memory block, i.e., an undamaged memory block. Step 208 is performed when the result is negative, i.e., the first memory block is damaged; otherwise, Step 209 is performed when the result is affirmative, i.e., the first memory block is undamaged and functioning.

Step 208 comprises obtaining a next memory block. When it is determined in Step 207 that the first memory block is damaged, a next memory block is checked until an undamaged memory block is identified.

Step 209 comprises erasing the memory block. When it is determined in Step 207 that the first memory block is undamaged, the first memory block is erased.

Step 210 comprises writing the environment variable. After erasing the first memory block, the environment variable is written into the first memory block.

In Step 201 to Step 210, the second memory block for storing the backup variable is first identified and the backup variable is written therein, and then the first memory block for storing the environment variable is identified and the environment variable is written therein. Step 206 to Step 210 may also be performed first before performing Step 201 to Step 205. That is, the first memory block for storing the environment variable is first identified and the environment variable is written therein, and then the second memory block for storing the backup variable is identified and the backup variable is written therein.

In one embodiment, a solution for piloting system boot is provided to optimize storage reliability of an environment variable, so that various unexpected situations may be appropriately handled to ensure a normal boot-up process of the system even in the event of a damaged environment variable. The solution according to the embodiment of the present disclosure comprises: rewriting the environment variable when a revocable error exists, expanding a retry mechanism for handling a read failure on the environment variable, preserving the read failure of the erroneous environment variable for facilitating future debugging, ensuring a normal boot-up process of the system by utilizing default settings of the environment variable even in a worse scenario, assigning a reserve capacity by taking damaged memory blocks in the NAND flash memory into consideration, and keeping two sets of backup variables in case of a sudden power-off. Compared with the prior art that only offers a simple approach of storing the environment variable, the solution of the present disclosure significantly enhances system reliability such that the environment variable is kept undamaged as much as possible. The proposed solution is apt for handling various unexpected situations to ensure a normal boot-up process of the system even if the environment variable is damaged.

Figure 3:
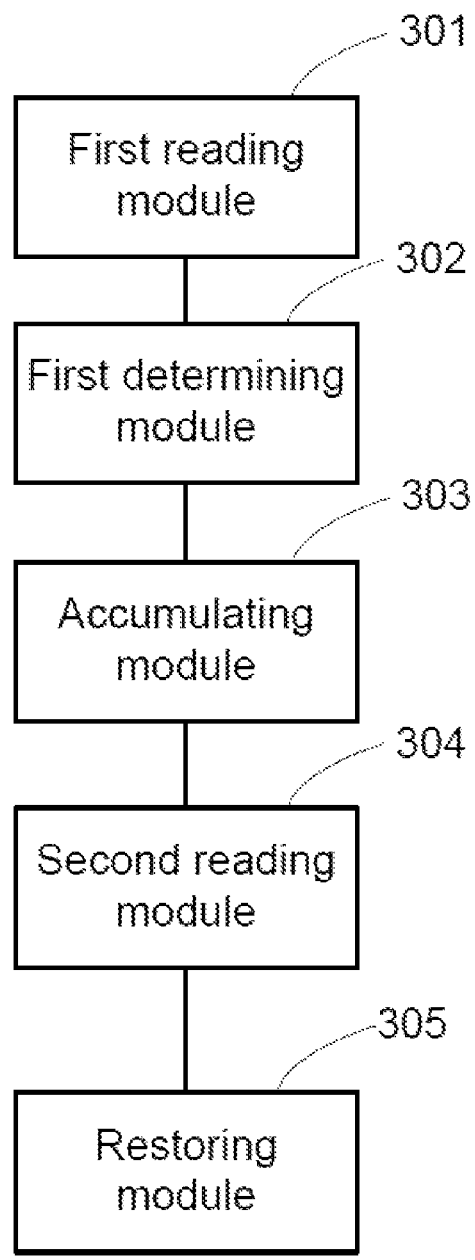
FIG. 3 is a logic block diagram of a pilot process apparatus for system boot according to an embodiment of the present disclosure.
Figure 4:
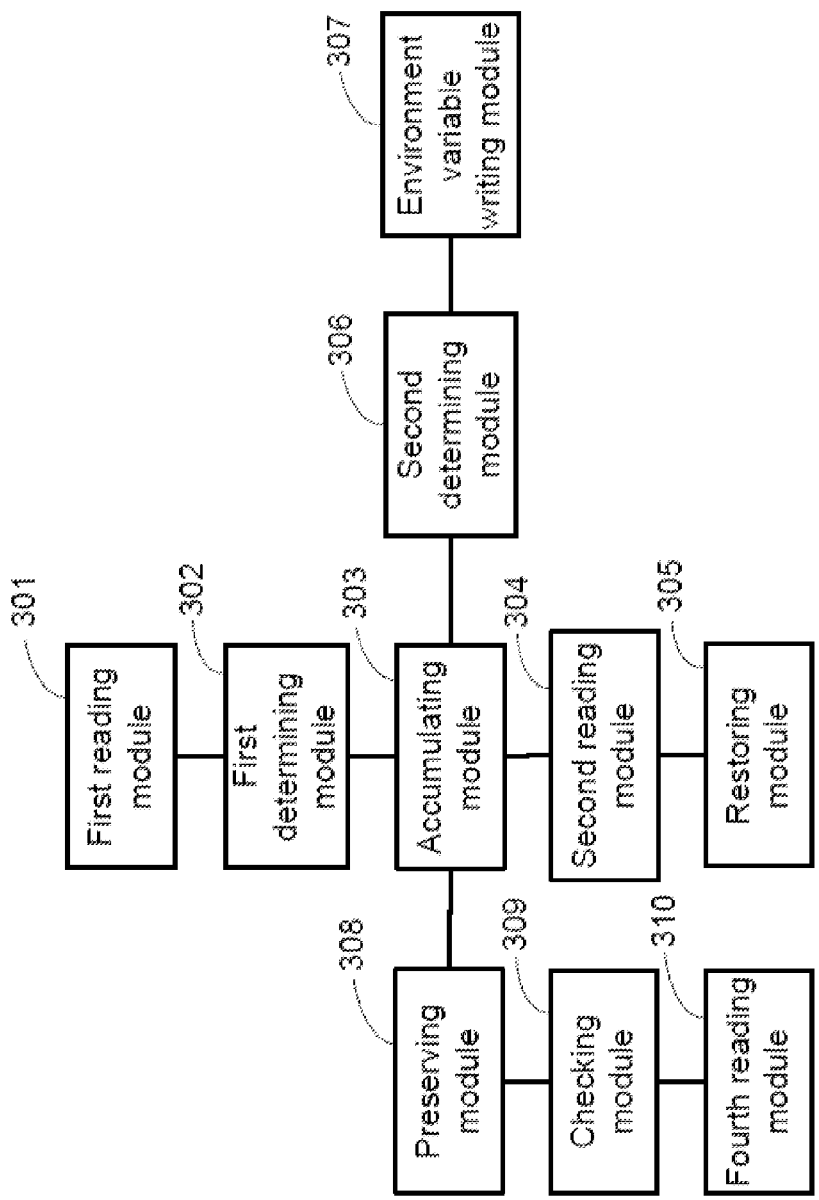
FIG. 4 is a logic block diagram of a pilot process apparatus for system boot according to another embodiment of the present disclosure.

FIG. 3 shows a block diagram of a pilot process apparatus for system boot according to an embodiment of the present disclosure. The apparatus comprises: a first reading module 301 that reads an environment variable for piloting the system boot from a NAND flash memory; a first determining module 302 that determines whether an irrevocable error exists in the environment variable read by the first reading module 301; an accumulating module 303 that continues reading the irrevocable errors when the first determining module 302 determines an irrevocable error exists in the environment variable for a predetermined threshold number of times; a second reading module 304 that reads a backup variable of the environment variable when a successively accumulated number of reading of the irrevocable error accumulated by the accumulating module 303 reaches the predetermined threshold, the backup variable being a backup of the environment variable read by the first reading module 301; and a restoring module 305 that restores the damaged environment variable according to the backup variable read by the second reading module 304.

The apparatus according to an embodiment of the present disclosure further comprises: a second determining module 306 that determines whether a revocable error exists in the environment variable read by the first reading module 301 when the first determining module 302 determines that no irrevocable error exists in the environment variable read by the first reading module; and a environment variable writing module 307 that rewrites the environment variable when the second determining module 306 determines that the revocable error exists in the environment variable read by the first reading module 301.

The apparatus according to an embodiment of the present disclosure further comprises: a preserving module 308 that preserves the environment variable when the irrevocable error still exists in the environment variable when the predetermined threshold is reached by the accumulating module 303.

The apparatus according to an embodiment of the present disclosure further comprises: a checking module 309 that determines whether the backup variable is usable; and a fourth reading module 310 that reads a default environment variable when the checking module 309 determines that the backup variable is unusable.

The apparatus according to an embodiment of the present disclosure further comprises: a first erasing module that erases a first memory block storing the environment variable when updating the environment variable; a first writing module that writes a new environment variable; a second erasing module that erases a second memory block storing the backup variable of the environment variable; and a second writing module that writes a backup variable of the new environment variable.

The apparatus according to an embodiment of the present disclosure further comprises: a first checking module that determines whether the second memory block is a damaged memory block, and checks for a next memory block when the second memory block is a damaged memory block until an undamaged memory block is identified; a backup variable writing module that erases the second memory block and writes in the backup variable when the first checking module determines that the second memory block is undamaged; a second checking module that determines whether the first memory block for storing the environment variable is a damaged memory block, and checking for a next memory block when the first memory block is a damaged memory block until an undamaged memory block is identified; and an environment variable writing module that erases the first memory block and writes in the environment variable when the second checking module determines that the first memory block is undamaged.

In this embodiment, a solution for piloting system boot is provided to optimize storage reliability of an environment variable, so that various unexpected situations may be appropriately handled to ensure a normal boot-up process of the system even in the event of a damaged environment variable. The solution according to the embodiment of the present disclosure comprises: rewriting the environment variable when a revocable error exists, increasing a retry mechanism for handling a read failure on the environment variable; preserving the read failure of the erroneous environment variable for facilitating future debugging; ensuring a normal boot-up process of the system by utilizing default settings of the environment variable even in a worse scenario; assigning a reserve capacity by taking damaged memory blocks in the NAND flash memory into consideration; and keeping two backups in case of a power-off. Compared with the prior art that only offers a simple approach of storing the environment variable, the solution of the present disclosure significantly enhances system reliability, so that the environment variable is kept undamaged as much as possible and is apt for handling various unexpected situations to ensure a normal boot-up process of the system even if the environment variable is damaged.

While the present disclosure has been described by way of example and in terms of the preferred embodiments, it is to be understood that the present disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pilot process method for system boot, comprising:
reading an environment variable for piloting the system boot from a NAND flash memory;
determining whether an irrevocable error exists in the environment variable, wherein the irrevocable error is of a first bit error rate;
determining whether a revocable error exists in response to no irrevocable error being determined to exist in the environment variable, wherein the revocable error is of a second bit error rate smaller than the first bit error rate;
rewriting the environment variable into the NAND flash memory in an event that it is determined the revocable error exists and no irrevocable error exists;
accumulating a successively accumulated number of reading of the irrevocable error in an event that the irrevocable error exists in the environment variable;
reading the backup variable of the environment variable when the successively accumulated number of reading of the irrevocable error reaches a predetermined threshold; and
restoring the environment variable according to the backup variable.

2. The method according to claim 1, wherein the revocable error is correctable and passes error checking and correction (ECC).

3. The method according to claim 1, wherein reading the backup variable of the environment variable comprises:
determining whether the backup variable is usable; and
reading the backup variable of the environment variable in an event that the backup variable is usable.

4. The method according to claim 3, further comprising:
after determining whether the backup variable is usable, reading a default environment variable in an event that the backup variable is unusable.

5. The method according to claim 4, further comprising:
before reading the backup variable of the environment variable, preserving the environment variable.

6. The method according to claim 1, further comprising:
erasing a first memory block of the NAND flash memory storing the environment variable when updating the environment variable;
writing a new environment variable to the first memory block;
erasing a second memory block of the NAND flash memory storing the backup variable of the environment variable; and
writing a backup variable of the new environment variable to the second memory block.

7. The method according to claim 1, further comprising:
determining whether a second memory block of the NAND flash memory storing the backup variable is damaged when writing the environment variable to a first memory block of the NAND flash memory for a first time;
checking for a next memory block in an event that the second memory block is damaged, until an undamaged memory block is identified;
erasing the second memory block and writing the backup variable to the second memory block in an event that the second memory block is undamaged;
determining whether the first memory block is damaged;
checking for a next memory block in an event that the first memory block is damaged, until an undamaged memory block is identified; and
erasing the first memory block and writing the environment variable to the first memory block in an event that the first memory block is undamaged.

8. A pilot apparatus for system boot, comprising:
a first reading module that reads an environment variable for piloting the system boot from a NAND flash memory, wherein:

two sets of the environment variable with identical content and serving as mutual backups are stored in the NAND flash memory,
one of the two sets of the environment variable is read for each boot-up process while the other of the two sets of the environment variable serves as a backup variable of the environment variable, and
both of the two sets of the environment variable are updated each time the environment variable is updated;
a first determining module that determines whether an irrevocable error exists in the environment variable, wherein the irrevocable error is of a first bit error rate;
a second determining module that determines whether a revocable error exists in the environment variable read by the first reading module in an event that the first determining module determines that no irrevocable error exists in the environment variable, wherein the revocable error is of a second bit error rate smaller than the first bit error rate;
an environment variable writing module that rewrites the environment variable into the NAND flash memory in an event that the second determining module determines that the revocable error exists in the environment variable read by the first reading module;
an accumulating module that accumulates a successively accumulated number of reading of the irrevocable error in an event that the first determining module determines that the irrevocable error exists in the environment variable;
a second reading module that reads the backup variable of the environment variable in an event that the successively accumulated number of reading of the irrevocable error accumulated by the accumulating module reaches a predetermined threshold; and
a restoring module that restores a damaged environment variable according to the backup variable read by the second reading module.

9. The apparatus according to claim 8, wherein the revocable error is correctable and passes error checking and correction (ECC).

10. The apparatus according to claim 8, further comprising:
a checking module that identifies whether the backup variable is usable; and
a fourth reading module that reads a default environment variable when the checking module identifies that the backup variable is unusable.

11. The apparatus according to claim 8, further comprising:
a preserving module that preserves the environment variable in an event that the irrevocable error still exists in the environment variable after being read for a predetermined threshold number of times by the second reading module.

12. The apparatus according to claim 8, further comprising:
a first erasing module that erases a first memory block of the NAND flash memory that stores the environment variable in when updating the environment variable;
a first writing module that writes a new environment variable to the first memory block;
a second erasing module that erases a second memory block of the NAND flash memory that stores the backup variable; and
a second writing module that writes a backup variable of the new environment variable to the second memory block.

13. The apparatus according to claim 8, further comprising:
a first checking module that determines whether a second memory block of the NAND flash memory that stores the backup variable of the environment variable is damaged before writing the environment variable to the NAND flash memory for a first time, and checks for a next memory block in an event that the second memory block is damaged until an undamaged memory block is identified;
a backup variable writing module that erases the second memory block and writes the backup variable to the second memory block in an event that the first checking module determines that the second memory block is undamaged;
a second checking module that determines whether a first memory block of the NAND flash memory that stores the environment variable is damaged, and checks for a next memory block in an event that the first memory block is damaged until an undamaged memory block is identified; and
an environment variable writing module that erases the first memory block and writes the environment variable to the first memory block in an event that the second checking module determines that the first memory block is undamaged.

* * * * *